United States Patent [19]

Henry

[11] Patent Number: 4,517,891
[45] Date of Patent: May 21, 1985

[54] CONTROL LINKAGE FOR CONTINUOUS ROLL BALING MACHINE

[75] Inventor: James W. Henry, Yorkton, Canada

[73] Assignee: Sperry Corporation, New Holland, Pa.

[21] Appl. No.: 556,230

[22] Filed: Nov. 29, 1983

[51] Int. Cl.³ ............................ B30B 5/06; A01D 39/00
[52] U.S. Cl. .................................... 100/88; 56/341
[58] Field of Search ............... 100/77, 88; 56/341, 56/342, 343, 344

[56] References Cited

U.S. PATENT DOCUMENTS 3,901,007 8/1975 Blanshine et al. ............ 100/88 X
4,035,999 7/1977 Crane et al. .................. 100/77 X
4,208,862 6/1980 Waldrop et al. ............... 100/88 X

*Primary Examiner*—Peter Feldman
*Attorney, Agent, or Firm*—Darrell F. Marquette; Frank A. Seemar; Larry W. Miller

[57] ABSTRACT

A machine for continuously forming roll bales of crop material has a lower apron and forward and rearward upper aprons cooperating to define front and rear bale forming chambers. A rotatable arm assembly supports the rearward upper apron, and a control linkage is provided for holding the arm assembly in a position so that it does not interfere with the discharge of a bale from the rear chamber.

3 Claims, 11 Drawing Figures

CONTROL LINKAGE FOR CONTINUOUS ROLL BALING MACHINE

BACKGROUND AND SUMMARY OF THE INVENTION

This invention relates generally to the type of roll baling machine that is capable of continuously forming roll bales of crop material while moving across a field without stopping to discharge such bales.

An example of this type of roll baling machine is disclosed in U.S. Pat. No. 4,035,999, assigned to the same assignee as the present application. The disclosed machine includes a lower apron and a pair of upper aprons. The upper aprons cooperate with the lower apron to define front and rear bale forming chambers. While a completed roll bale is being wrapped with twine and discharged from the rear chamber, another bale is started in the front chamber. When the bale started in the front chamber reaches a predetermined size, it is transferred to the rear chamber where it is completed. This provides for continuous baling operation of the machine.

A drawback of the machine disclosed in U.S. Pat. No. 4,035,999 is that the distance a bale is transferred from the front chamber to the rear chamber is too great, thereby often resulting in damage to the bale during its transfer from the front to the rear chamber.

The above-mentioned drawback is overcome by providing an arrangement where a first upper apron cooperates with the lower apron to define the front chamber while a second upper apron cooperates with the first upper apron to define the rear chamber. This arrangement significantly reduces the bale transfer distance between the front and rear chambers. An arm assembly is provided to support part of the second upper apron, and the arm assembly is rotatable from a first position when the rear chamber is empty to a second position during formation of a bale in the rear chamber.

According to the present invention, control means are provided for holding the arm assembly in its second position while a bale is being discharged from the rear chamber. In the preferred embodiment, this control means includes a link member having a lost motion connection with the arm assembly as the arm assembly moves between its first and second positions.

DESCRIPTION OF THE PREFERRED EMBODIMENT

Figure 1:
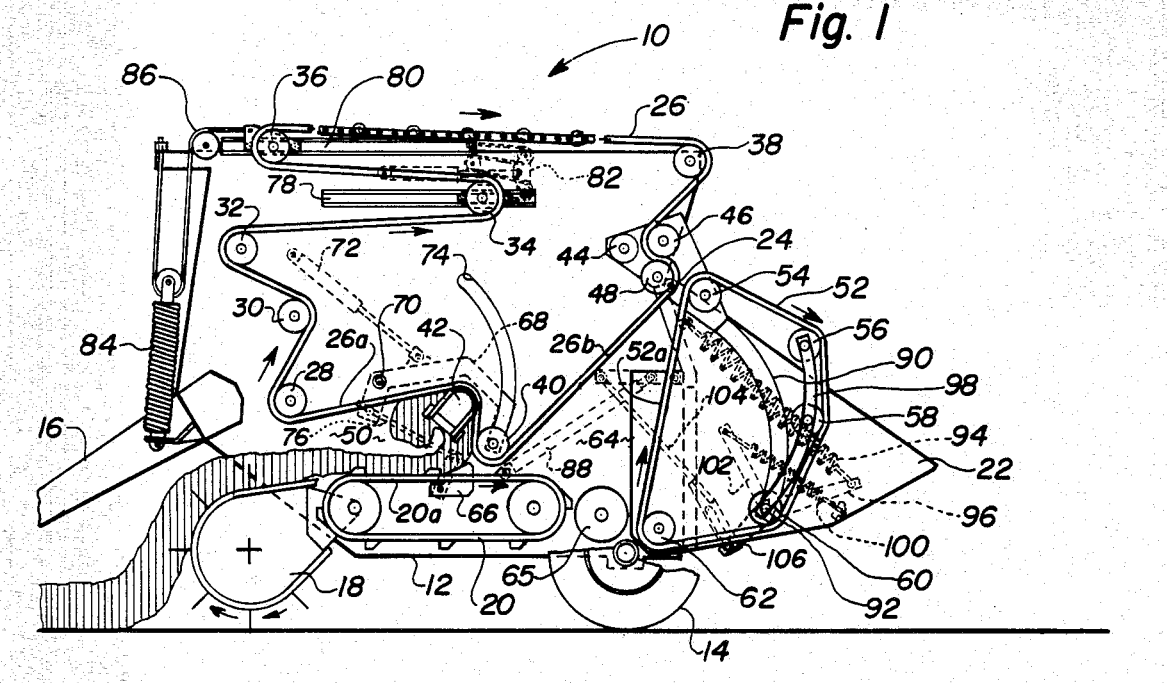
FIG. 1 is a somewhat schematic side elevation view of a roll baling machine according to the present invention at the initiation of the baling operation.

Referring to FIG. 1, a roll baling machine 10 according to the present invention includes a base frame 12 supported at its sides by wheels 14 and adapted for connection to a tractor (not shown) by a tongue 16. A pickup device 18 and a lower apron 20 are supported on the base frame 12. The lower apron 20 is preferably of the type disclosed in U.S. Pat. No. 3,901,007, incorporated herein by reference. A rear frame 22 is pivotally connected at 24 to the base frame 12.

A first upper bale forming apron 26 is movably supported on guide members 28,30,32,34,36,38,40,42 carried on the opposite sides of the base frame 12 and on guide members 44,46,48 carried at the opposite sides of the rear frame 22. The upper course 20a of the lower apron 20 cooperates with a course 26a of the first upper apron 26 extending between the guide members 28 and 40 to define an expandable front bale chamber 50.

A second upper bale forming apron 52 is movably supported on guide members 54,56,58,60,62 carried at the opposite sides of the rear frame 22. A course 52a of the second upper apron 52 extending between the guide members 54 and 62 cooperates with a course 26b of the first upper apron 26 extending between the guide members 40 and 48 to define an expandable rear bale chamber 64. The rear part of the lower apron 20 and a roller 65 are disposed at the bottom of the rear bale chamber 64. The first and second upper aprons 26 and 52 are preferably formed of a pair of endless link-type chains connected at spaced intervals by transverse bars or slats such as the upper apron disclosed in U.S. Pat. No. 3,901,007. The guide members 42 are of the cam type also disclosed in this patent.

A series of ramps 66 are carried on the base frame 12 and extend transversely between the opposite sides thereof. These ramps 66 are pivotally movable and are similar to those disclosed in U.S. Pat. No. 4,035,999, incorporated herein by reference, and designated therein by the numeral "282". The guide members 40 are carried by a pair of arms 68 which are pivotally movable on shafts 70 secured to the base frame 12. Hydraulic cylinders 72 control the pivotal movement of the arms 68, and slots 74 formed in the sides of the base frame 12 limit and guide the upward and downward movement of the guide members 40. An actuator mechanism 76 interconnects the arms 68 and the ramps 66. The guide members 34 and 36 are movable fore and aft in channels 78 and 80, respectively, mounted on the base frame 12. Idler mechanisms 82 control the movement of the guide members 34 in the channel 76. Springs 84 are connected to the guide members 36 by cables or chains 86 to urge the guide members 36 forward in the channels 80 to thus provide tension in the apron 26.

Figure 8:
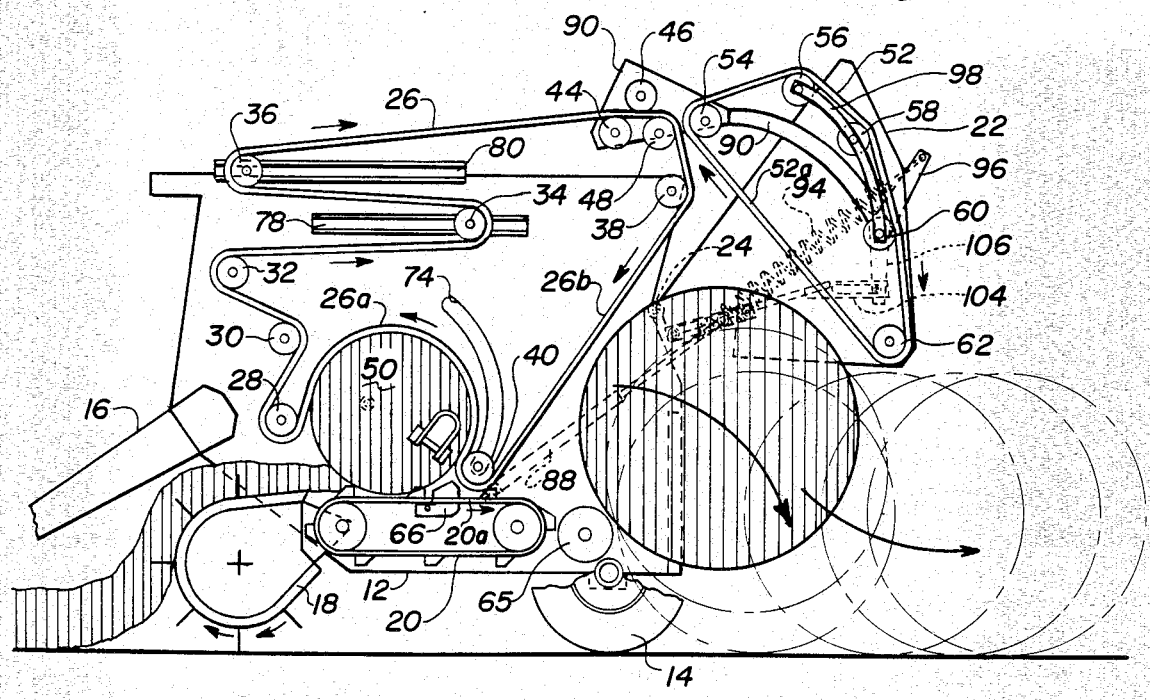
FIG. 8 is a view similar to FIG. 1 during discharge of the completed bale from the rear chamber.

Hydraulic cylinders 88 are connected between the base frame 12 and the rear frame 22 for moving the rear frame 22 between the closed position shown in FIG. 1 and the open position shown in FIG. 8. The guide members 44,46,48,54 and 60 are carried on an arm assembly 90 that is pivoted at 92 on the rear frame 22. Springs 94 are connected to lever portions 96 of the arm assembly 90 to urge the arm assembly 90 in a counterclockwise direction about the pivot 92 when viewed in FIG. 1. The guide members 56 and 58 are carried on another arm assembly 98 that is also pivoted at 92 on the rear frame 22. Springs 100 are connected to lever portions 102 of the arm assembly 98 to urge the arm assembly 98 in a clockwise direction about the pivot 92 when viewed in FIG. 1. Springs 94 are stronger than springs 100. A control linkage 104 is connected between the rear frame 22 and other lever portions 106 of the arm assembly 90 to pull the arm assembly 90 in a clockwise direction against the springs 94 when viewed in FIG. 1, during movement of the rear frame 22 to the open position of FIG. 8.

OPERATION

Figure 2:
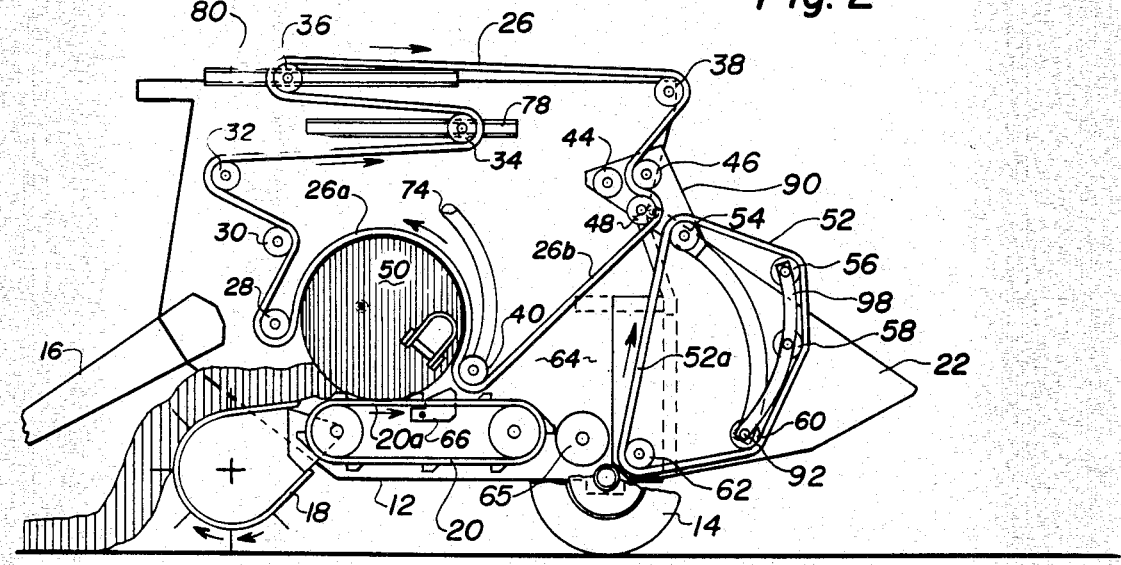
FIG. 2 is a view similar to FIG. 1 when a bale of predetermined size has been formed in the front chamber.

As the machine 10 is pulled across a field by a tractor, the pickup device 18 delivers crop material into the front bale chamber 50 where it is coiled by the cooperating movement of the lower apron 20 and the upper apron 26 (as indicated in FIG. 1) to start the core of a roll bale. During this stage of the operation, the guide members 40 are in their lowermost position in the slots 74 and the ramps 66 are pivoted upwardly to extend through and above the upper course 20a of the lower apron 20 so that the upper apron 26 and the ramps 66 together close the rear of the front bale chamber 50 and thereby effectively prevent material from entering the rear bale chamber 64. As the bale increases in diameter, as shown in FIG. 2, the guide members 36 move rearward in the channels 80 against the force of the spring 84. This allows the course 26a of the apron 26 that extends between the guide members 28 and 40 to expand around the bale.

Figure 3:
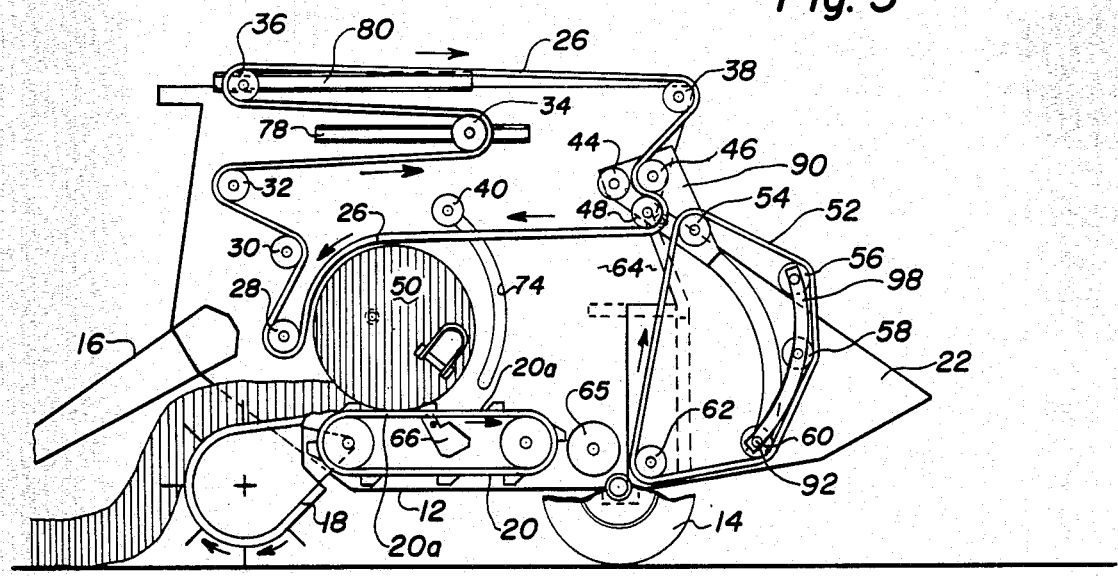
FIG. 3 is a view similar to claim 1 when the bale is ready to be transferred from the front chamber to the rear chamber.

When the bale reaches a predetermined diameter, the guide members 40 are moved upward in the slots 74, as shown in FIG. 3, by contracting the hydraulic cylinders 72 in order to pivot the arms 68 upwardly on the shafts 70. The guide members 36 are moved forward in the channels 80 by the springs 84 to take up the slack in the apron 26 resulting from the movement of the guide members 40 to their uppermost positions in the slots 74. The actuator mechanism 76 connecting the arms 68 and the ramps 66 causes downward pivoting movement of the ramps 66 simultaneously with the upward movement of the guide members 40. The ramps 66 are pivoted downwardly below the upper course 20a of the lower apron 20. These movements of the guide members 40 and the ramps 66 open up the rear of the front bale chamber 50 and the front of the rear bale chamber 64.

Figure 4:
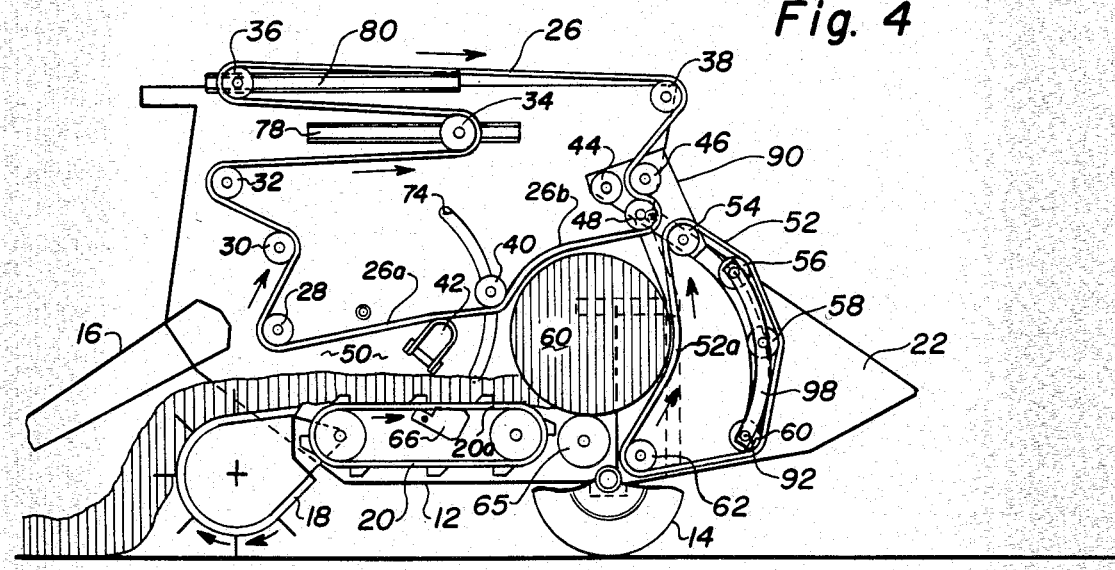
FIG. 4 is a view similar to FIG. 1 immediately after the bale has been transferred from the front chamber to the rear chamber.

The bale is then transferred by the lower apron 20 into the rear bale chamber 64, as shown in FIG. 4, where it rests primarily on the roller 65. To assist the transfer of the bale, the apron 26 is either stopped or driven in reverse direction. Next, the guide members 40 are moved downward in the slots 74 to an intermediate position by extending the hydraulic cylinders 72 in order to pivot the arms 68 downward about the shafts 70. In this intermediate position of the guide members 40, the course 26a of the apron 26 that extends between the guide members 28 and 40 is supported lightly by the guide members 42. At the same time, the course 26b of the apron 26 that extends between the guide members 40 and 48 expands around a forward upper portion of the bale to maintain the bale in the rear bale chamber 64.

The course 52a of the apron 52 that extends between the guide members 54 and 62 expands slightly around the rear of the bale. This expansion of the apron course 52a is permitted by forward pivoting movement of the arm assembly 98 on the pivot 92. The actuator mechanism 76 connecting the arms 68 and the ramps 66 causes some upward pivoting movement of the ramps 66 simultaneously with the downward movement of the guide members 40 to their intermediate positions. However, the ramps 66 are not pivoted upward far enough to extend above the upper course 20a of the lower apron 20. Therefore, the ramps 66 nor the apron 26 prevent or impede material from entering the rear bale chamber 64. Material is delivered through the front bale chamber 50 into the rear bale chamber 64 by the lower apron 20, as seen in FIG. 4, to complete the bale.

Figure 5:
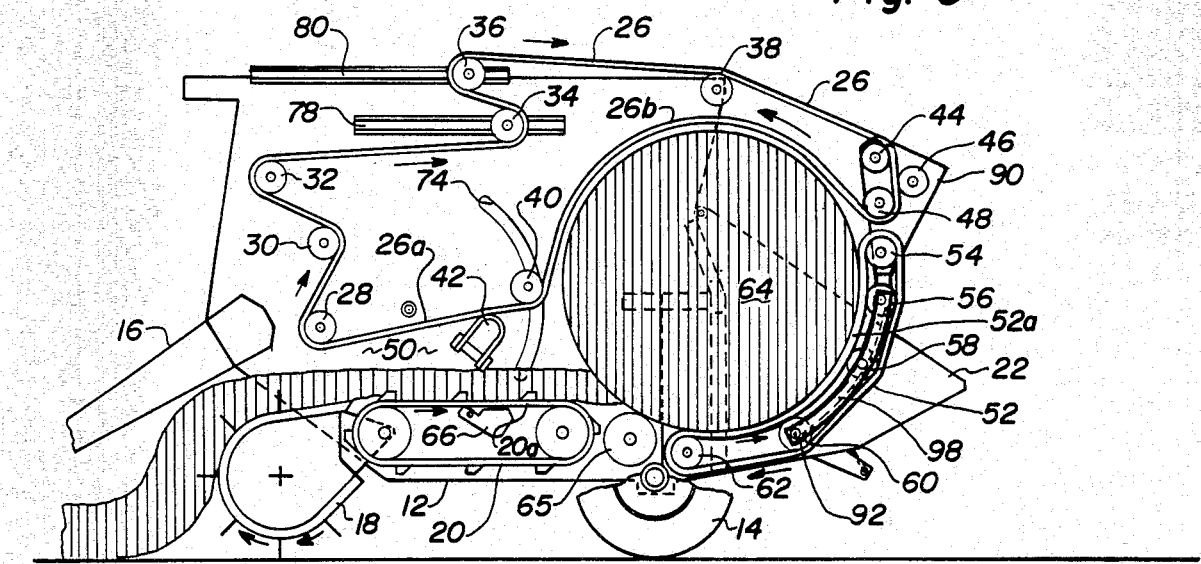
FIG. 5 is a view similar to FIG. 1 during completion of the bale in the rear chamber.

The bale increases in diameter, as shown in FIG. 5, thereby expanding the course 26b of the apron 26 that extends between the guide members 40 and 48, and also expanding the course 52a of the apron 52 that extends between the guide members 54 and 62. The guide members 36 move rearward in the channels 80 to permit the expansion of the apron course 26b. The arm assemblies 90 and 98 pivot rearwardly about pivot 92 during expansion of apron course 26b and expansion of apron course 52a.

Figure 6:
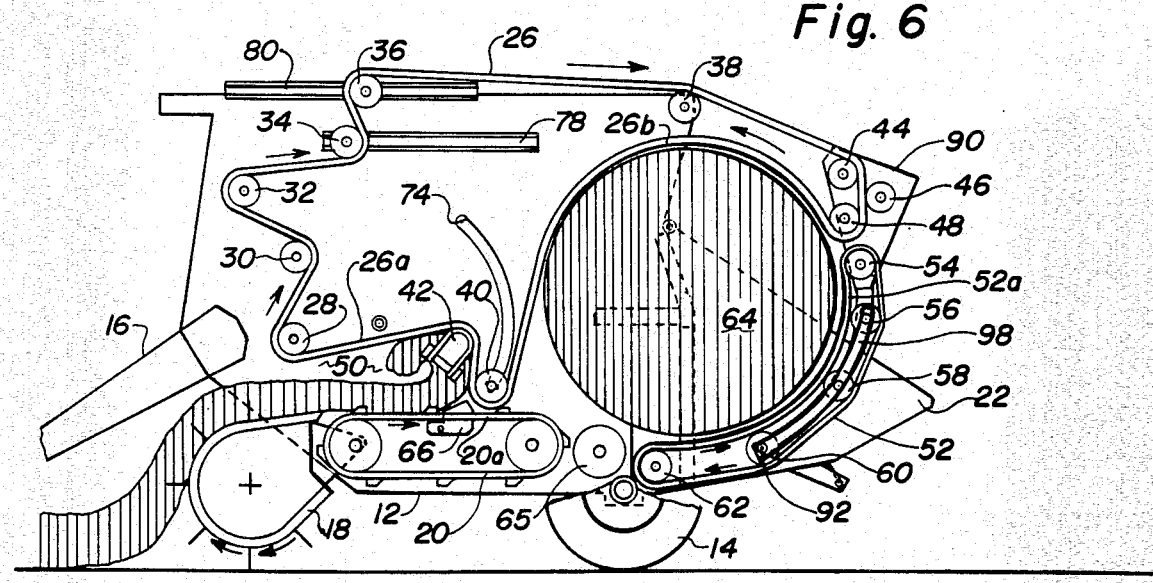
FIG. 6 is a view similar to FIG. 1 when the bale has been completed in the rear chamber and another bale is being started in the front chamber.

When the bale reaches the desired diameter, the guide members 40 are moved downward in the slots 74, as shown in FIG. 6, by further extending the hydraulic cylinders 72 to pivot the arms 68 downward on the shafts 70. The idler mechanisms 82 allow the guide members 34 to move forward in the channels 78 to relax some of the tension in the apron 26. The guide members 40 move to their lowermost position in slots 74 and the actuator mechanism 76 connected between the arms 68 and ramps 66 simultaneously causes the ramps 66 to pivot upwardly above the upper course 20a of the lower apron 20. The apron 26 and the ramps 66 close the rear of the front bale chamber 50 and thus cut off the delivery of material to the rear bale chamber 64. The core of another roll bale is then started in the front bale chamber 50.

Figure 7:
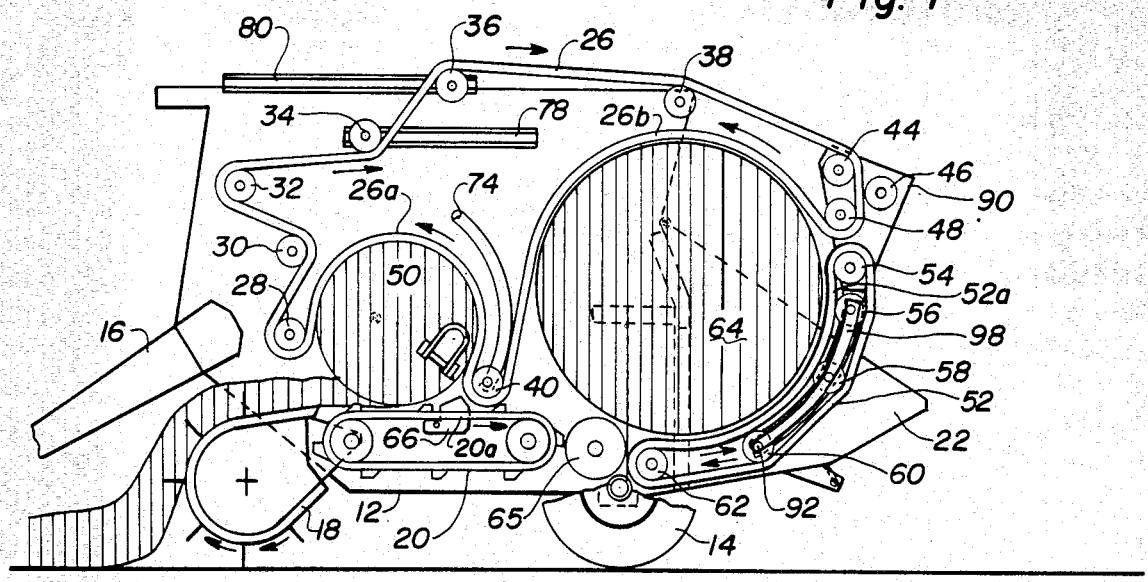
FIG. 7 is a view similar to FIG. 1 when the completed bale in the rear chamber is being wrapped with twine as the bale in the front chamber is being formed.

While the second bale increases in diameter in the front bale chamber 50, as shown in FIG. 7, the completed bale which is still disposed in the rear bale chamber 64 is wrapped with twine or other suitable material in a conventional manner. When the twine wrapping is completed, the hydraulic cylinders 88 are extended to move the rear frame 22 upwardly to the open position of FIG. 8. The idler mechanisms 82 move the guide members 34 rearward in the channels 78 to help take up some of the slack in the apron 26. The control linkage 104 acts against the springs 94 to maintain the arm assembly 90 in a position where it does not interfere with the upward opening movement of the rear frame 22. The completed bale is discharged from the machine 10 in the manner indicated in FIG. 8 while the second bale continues to be formed in the front bale chamber 50. After discharging the completed bale, the hydraulic cylinders 88 are contracted to move the rear frame 22 downwardly to its closed position, and the parts of the machine 10 are once again located as shown in FIG. 2 so that the baling operation may continue without interruption.

Figure 9:
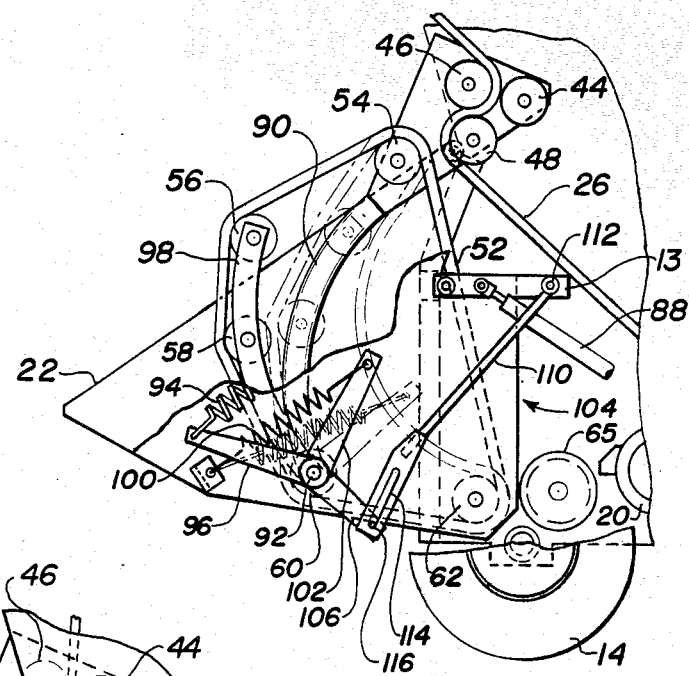
FIG. 9-11 are enlarged views illustrating the control linkage of the present invention taken at different stages of bale formation.
Figure 10:
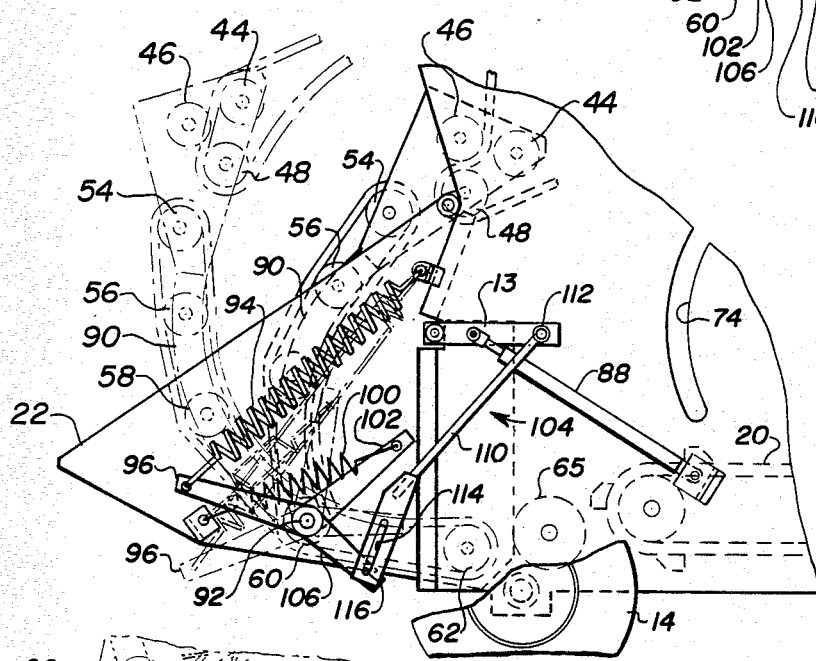
Figure 11:
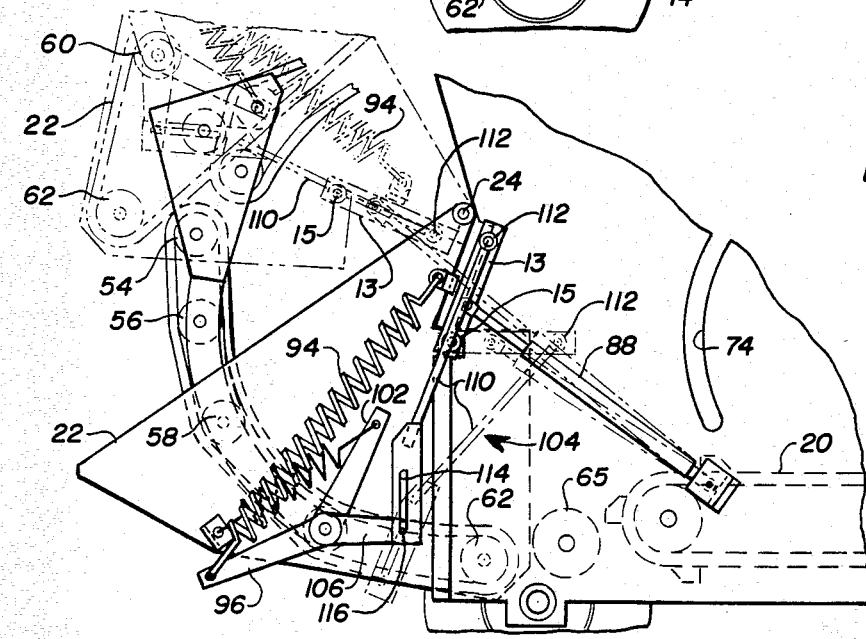

According to the present invention, the control linkage 104 as best shown in FIGS. 9-11 includes link members 110 having a pivotal connection 112 at one of their ends with frame members 13 of the rear frame 22. The other ends of the link members 110 have elongated slots 114 formed therein which slidably receive pins 116 mounted on the lever portions 106 of the arm assembly 90.

During the stages of bale formation illustrated in FIGS. 1-4, the arm assembly 90 remains in the forward position shown in FIG. 9 and the pins 116 are disposed at the outer ends of the slots 114. During the stage of bale formation illustrated in FIG. 5 where the bale is being completed in the rear bale chamber 64, the arm assembly 90 is rotated rearwardly in a counterclockwise direction about pivot 92 as seen in FIG. 10 to a rearward position. This rotation of the arm assembly 90 causes the pins 116 to slide upwardly in the slots 114 toward the inner ends of the slots 114 without resulting in any movement of the link members 110, thereby constituting a lost-motion connection between the arm assembly 90 and the link members 110.

As the rear frame 22 is raised as illustrated in FIG. 8 to discharge a completed bale from the rear chamber 64, the frame members 13 are pivoted at 15 in a counterclockwise direction as viewed in FIG. 11. This pivoting of the frame members 13 causes upward movement of the link members 110 until the pins 116 reach the outer ends of the slots 114. The arm assembly 90 is then prevented from rotating forward about the pivot 92 and is held in its rearward position by the control linkage 104, thereby preventing the arm assembly 90 from interferring with the upward opening movement of the rear frame 22 while discharging a bale from the rear bale chamber 64.

If the control linkages 104 were not used, the springs 94 would tend to urge the arm assembly 90 forward where it might interfere with the raising and lowering of the rear frame 22.

In the preferred embodiment of the invention, the movements of the various parts of the roll baling machine 10 would be controlled automatically by using conventional electronic equipment. However, they may also be controlled mechanically by an operator with the aid of visual indicators.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

Having thus described the invention, what is claimed is:

1. In a roll baling machine having a lower apron, a first upper apron cooperating with said lower apron to define a front bale forming chamber, a second upper apron cooperating with said first upper apron to define a rear bale forming chamber, an arm assembly supporting part of said second upper apron, said arm assembly being rotatable from a first position when said rear bale forming chamber is empty to a second position during formation of a roll bale in said rear bale forming chamber, the improvement comprising:

control means for holding said arm assembly in said second position while a roll bale is being discharged from said rear bale forming chamber, and said control means including a link member having a lost-motion connection with said arm assembly as said arm assembly moves between said first and second positions.

2. The improvement of claim 1, wherein said lost-motion connection consists of said link member having an elongated slot formed therein for slidably receiving a pin mounted on said arm assembly.

3. The improvement of claim 2, further comprising resilient means normally urging said arm assembly toward said first position.

* * * * *